United States Patent
Pfaller

(10) Patent No.: US 10,065,733 B2
(45) Date of Patent: Sep. 4, 2018

(54) FLEXBEAM UNIT FOR A BEARINGLESS OR A HINGE AND BEARINGLESS MULTI-BLADE ROTOR OF A ROTARY WING AIRCRAFT

(71) Applicant: AIRBUS HELICOPTERS DEUTSCHLAND GMBH, Donauworth (DE)

(72) Inventor: Rupert Pfaller, Riemerling (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 906 days.

(21) Appl. No.: 14/595,547

(22) Filed: Jan. 13, 2015

(65) Prior Publication Data

US 2015/0197334 A1    Jul. 16, 2015

(30) Foreign Application Priority Data

Jan. 14, 2014 (EP) ..................... 14400002

(51) Int. Cl.
*B64C 27/33* (2006.01)
*B64C 27/48* (2006.01)

(52) U.S. Cl.
CPC .............. *B64C 27/33* (2013.01); *B64C 27/48* (2013.01)

(58) Field of Classification Search
CPC .......... B64C 27/32; B64C 27/33; B64C 27/48
See application file for complete search history.

(56) References Cited

U.S. PATENT DOCUMENTS

| 4,344,739 A | 8/1982 | Derschmidt et al. |
| 5,820,344 A * | 10/1998 | Hamilton ................ B64C 27/33 |
| | | 416/134 A |
| 7,275,913 B2 | 10/2007 | Becker et al. |
| 7,384,238 B2 | 6/2008 | Becker et al. |

FOREIGN PATENT DOCUMENTS

| EP | 0019047 | 11/1980 |
| EP | 0421631 | 4/1991 |
| WO | 2004089747 | 10/2004 |
| WO | 2004089748 | 10/2004 |

OTHER PUBLICATIONS

Extended European Search Report for EP 14400002.3, Completed by the European Patent Office, dated Jun. 12, 2014, 5 Pages.

* cited by examiner

*Primary Examiner* — Richard Edgar
(74) *Attorney, Agent, or Firm* — Brooks Kushman P.C.

(57) ABSTRACT

A flexbeam unit comprising a plurality of flexbeam elements, each defining a load passing member that is attachable to a rotor hub associated with a rotor shaft of the multi-blade rotor, the plurality of flexbeam elements defining a predetermined number of torsion elements that are connectable with associated rotor blades of the multi-blade rotor, wherein at least one of the predetermined number of torsion elements comprises at least one first flexbeam element defining a first longitudinal direction and at least one second flexbeam element defining a second longitudinal direction, wherein the at least one first and second flexbeam elements are interconnected by a beam connector in a direction transverse to the first and/or second longitudinal directions.

15 Claims, 5 Drawing Sheets

Figure 1:
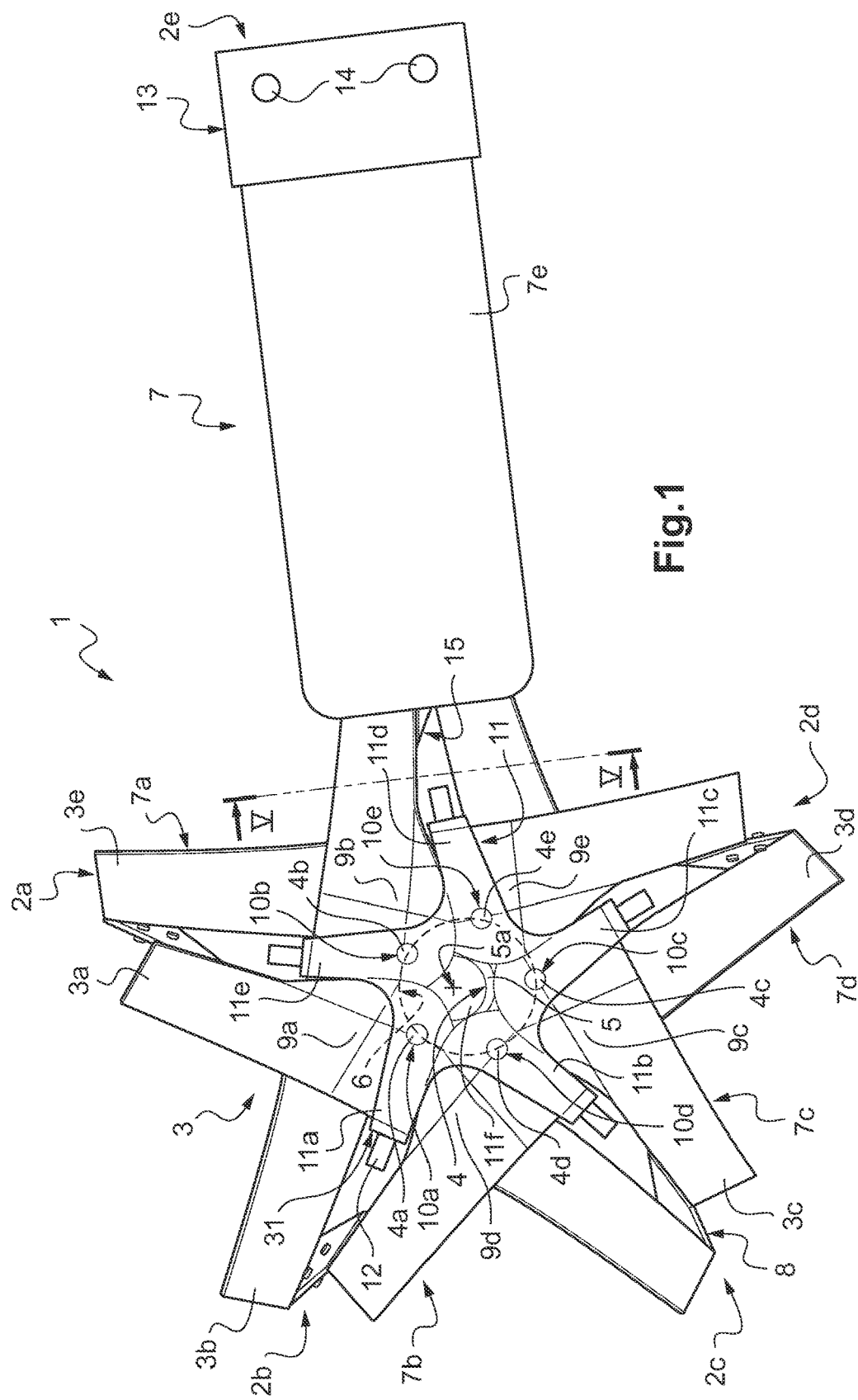

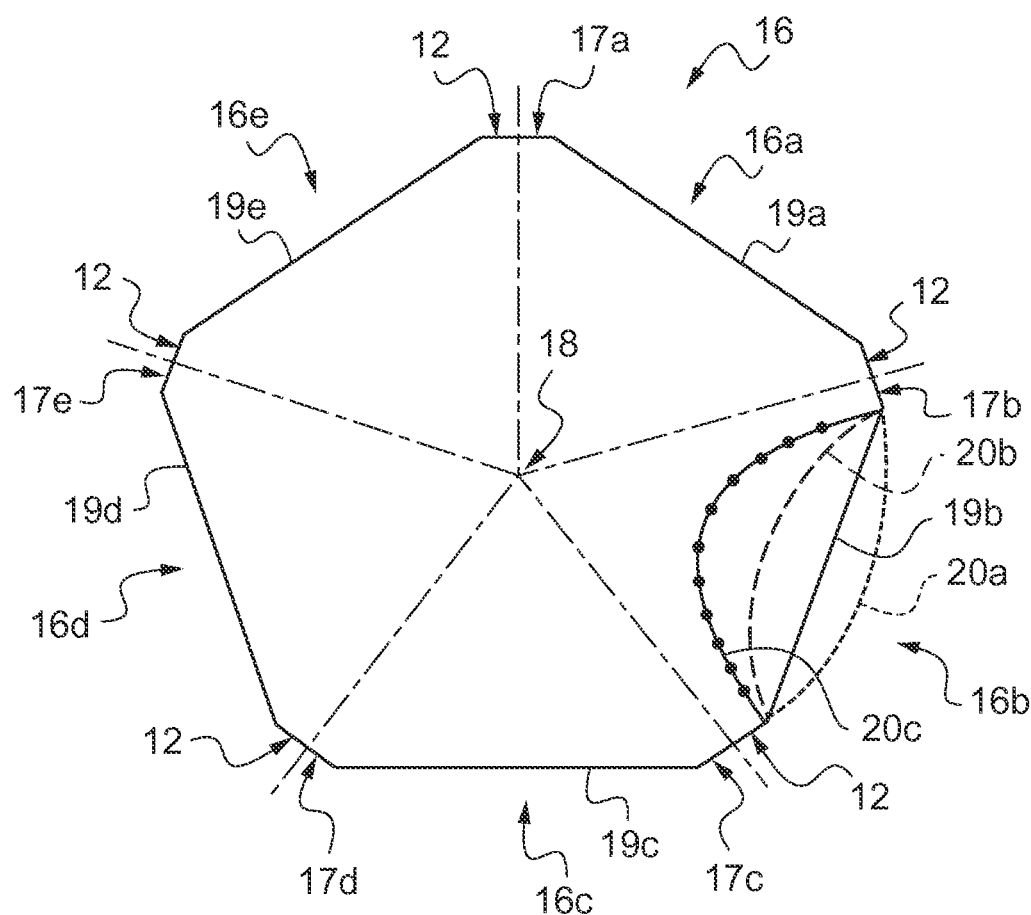
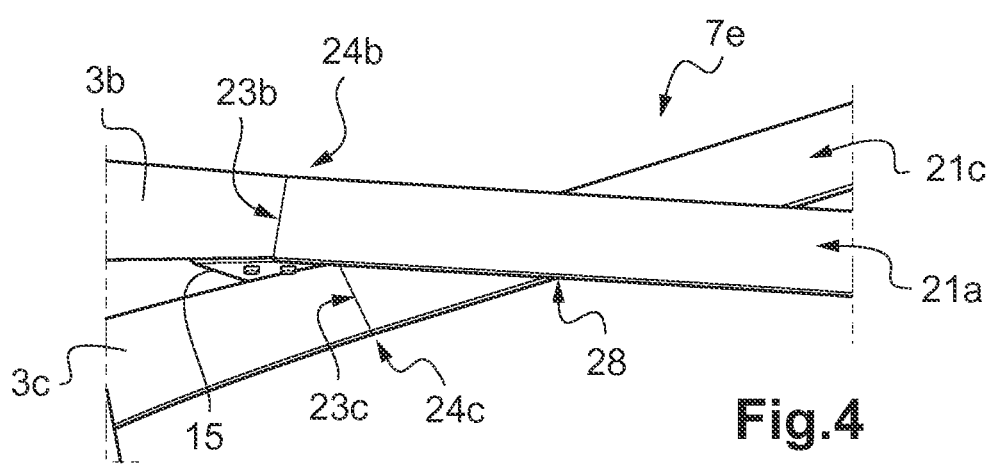

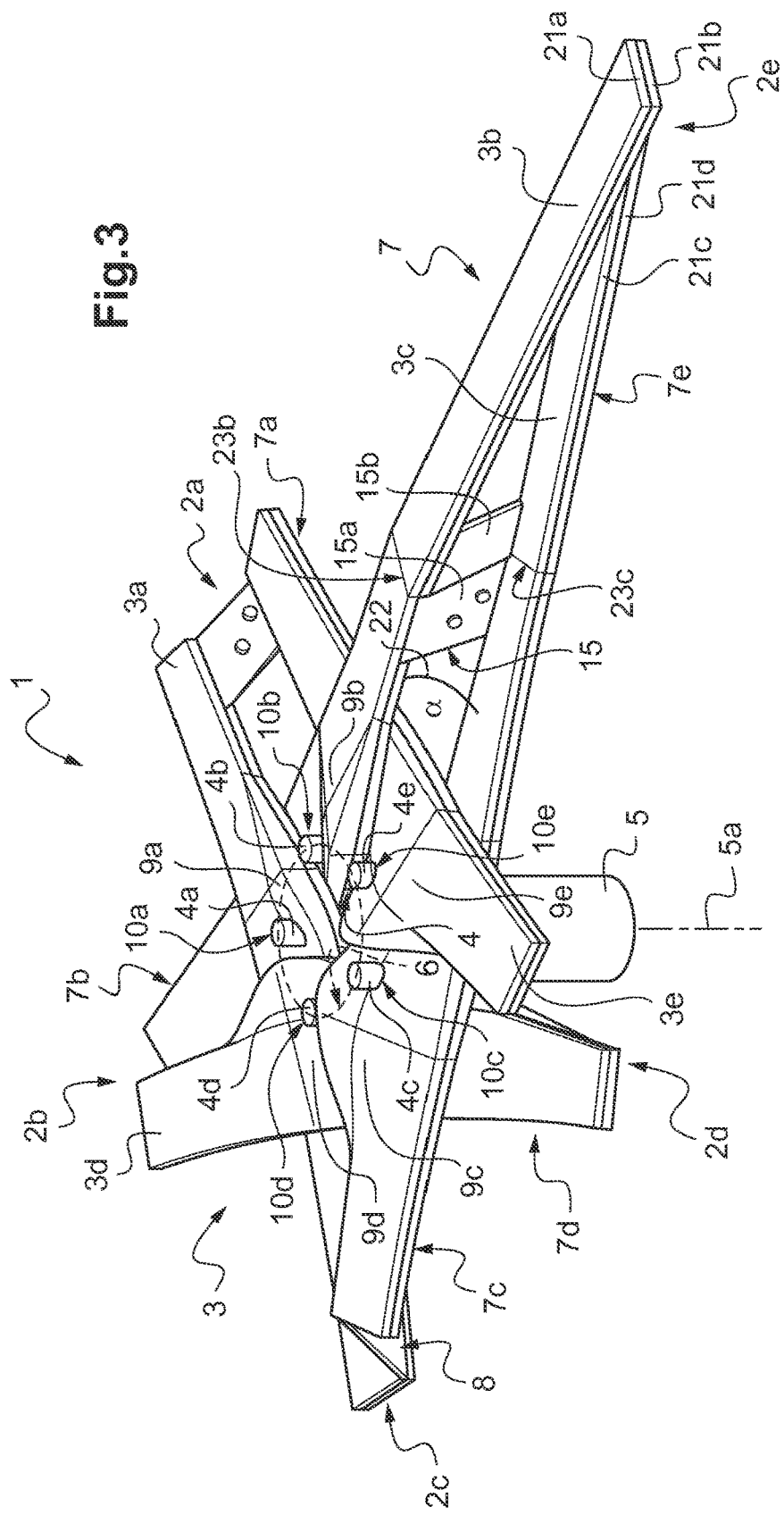

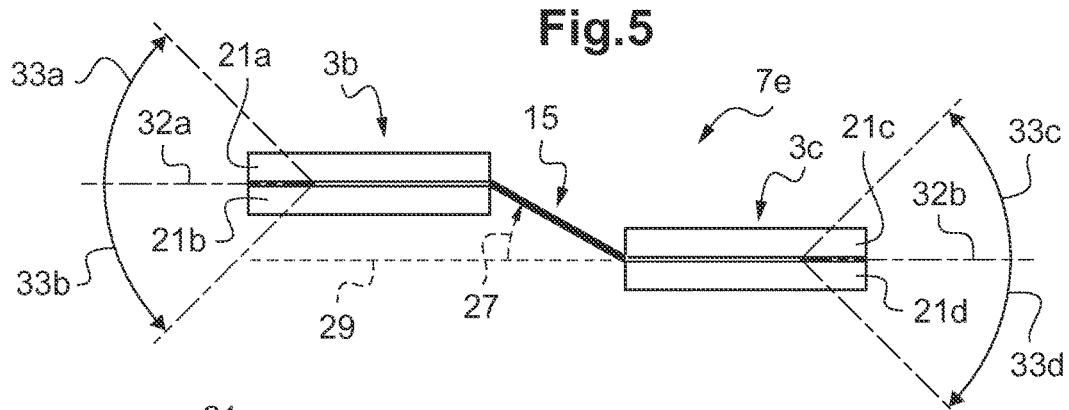
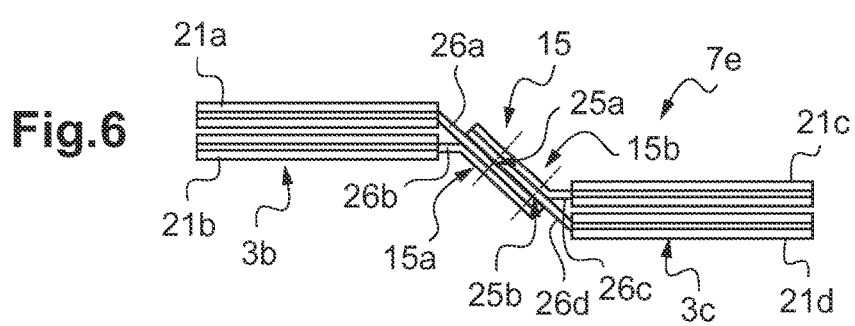
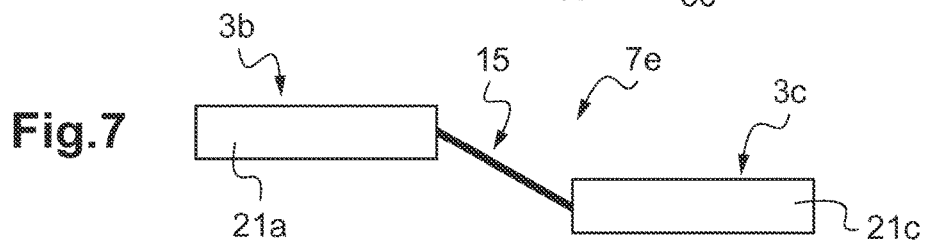
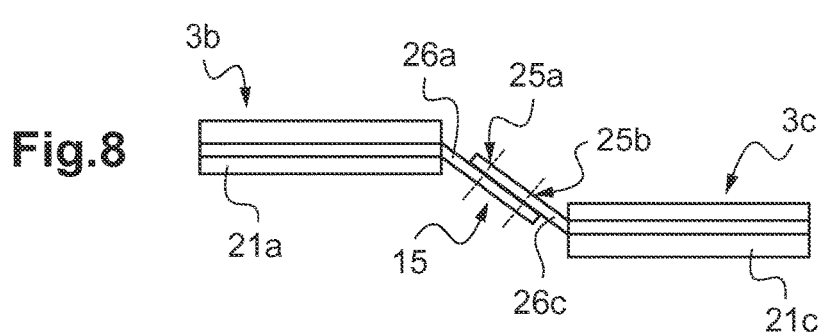
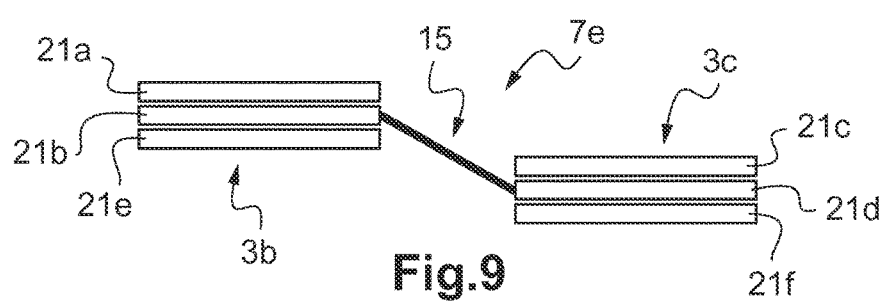

FLEXBEAM UNIT FOR A BEARINGLESS OR A HINGE AND BEARINGLESS MULTI-BLADE ROTOR OF A ROTARY WING AIRCRAFT

CROSS REFERENCE TO RELATED APPLICATION

This application claims priority to European patent application No. EP 14 400002.3 filed on Jan. 14, 2014, the disclosure of which is incorporated in its entirety by reference herein.

BACKGROUND OF THE INVENTION (1) Field of the Invention

The invention is related to a flexbeam unit for a multi-blade rotor of a rotary wing aircraft, said flexbeam unit comprising a plurality of flexbeam elements with the features of claim 1.

(2) Description of Related Art

A flexbeam unit is used in a so-called bearingless or a so-called hinge- and bearingless rotor system to connect rotor blades of a multi-blade rotor of a rotary wing aircraft to an associated rotor shaft of the aircraft. During operation, i.e. rotation of the multi-blade rotor, the flexbeam unit must withstand tremendous centrifugal forces that the rotor blades apply thereto, while permitting their flapping, pitch and lead/lag motions. Therefore, the flexbeam unit comprises special, in particular fiber reinforced composite material flexbeam elements that are flexible enough in torsion to allow twisting for blade movement without bearings, in the case of a bearingless rotor system, or without discrete hinges, in the case of a hingeless rotor system.

These flexbeam elements usually possess lead-lag-soft regions that permit motions of associated rotor blades in a bearingless or a hinge- and bearingless rotor system in the lead-lag direction. The lead-lag-soft regions thus constitute fictitious vertically oriented axes, so-called virtual lead-lag hinges, about which the rotor blades execute forward and backward lead-lag motions. Furthermore, these flexbeam elements realize flapwise-soft regions that enable flapping of the associated rotor blades in the vertical direction and, thus, constitute fictitious horizontally oriented axes, so-called virtual flapping hinges, about which the associated rotor blades execute upward and downward flapwise motions in a bearingless or a hinge- and bearingless rotor system. The distance between these virtual flapping hinges and the axis of the rotor shaft is referred to as the flapping hinge distance. Moreover, only in a bearingless rotor system, these flexbeam elements usually comprise torsion weak regions.

The documents WO 2004/089747 A1 and U.S. Pat. No. 5,820,344 describe such a bearingless or hinge- and bearingless rotor system, which comprises flexbeam elements that define load passing members and that are attachable to a rotor hub associated with a rotor shaft of the rotor systems. Each pair of flexbeam elements defines at least partly a torsion element that is either integrally formed with, or connectable via an elongated mid portion to, an associated rotor blade. Each torsion element comprises a first flexbeam element defining a first longitudinal direction and a second flexbeam element defining a second longitudinal direction, said first and second longitudinal directions being inclined to each other with a predetermined inclination angle.

However, in a bearingless or a hinge- and bearingless rotor system, the flapping hinge distance is generally relatively large. The flapping hinge distance is usually approximately 7 to 12% of a given rotor-disc radius, measured from the axis of the rotor shaft radially outward to a tip of a selected rotor blade. A large flapping hinge distance in a bearingless or a hinge- and bearingless rotor system allows, during operation, for a good control response and maneuverability of the rotary wing aircraft, but unfortunately also leads to a high natural flapping frequency. This relatively high natural flapping frequency and the vibrations that result therefrom in the bearingless or the hinge- and bearingless rotor system are disadvantageous in terms of flying characteristics of the rotary wing aircraft and lead to large stresses on blade connectors provided at the flexbeam elements for connection of the associated rotor blades. Because of these large stresses and the strength that is therefore required for the flexbeam elements, it is extremely difficult to reduce the virtual flapping hinge distance or decrease it below the specific value of about 7%.

The document EP 1 613 534 B1 describes a multi-blade rotor having four rotor blades, wherein each two rotor blades are located exactly opposite to one another with a 180° offset and wherein very flatly designed flexbeam elements associated with these rotor blades are embodied continuously, i.e. with no interruption, and attached to an associated rotor star. The flexbeam elements are realized as connector arms, each connecting a pair of rotor blades, i.e. two diametrically opposed rotor blades. More specifically, each pair of rotor blades is connected via two parallel connector arms that pass an associated rotor shaft on diametrically opposed passing points in a tangential manner, such that the pair of rotor blades and the two connector arms form an oval-shaped opening. As a result, centrifugal-force segments formed by these connector arms are likewise continuous so that the considerable centrifugal forces applied by one of the rotor blades of a given pair of rotor blades can directly be transferred to the diametrically opposed rotor blade. Furthermore, each pair of rotor blades possesses two common auxiliary flapping hinges and a common or different virtual lead-lag-hinge. Accordingly, a flapwise-soft connection of the rotor blades is produced by the fact that the connector arms can deflect between auxiliary flapping hinges, thus, leading to a greater softness in the connection region.

While the realization of flexbeam elements in the form of such connector arms allows to reduce the virtual flapping hinge distance to values of less than 7%, these connector arms are complicated in manufacturing because of their reduced cross section and their very flat design, which however need to allow for a predetermined weakness in torsion, so that they only have a comparatively reduced fatigue lifetime. The reduced cross section and very flat design also complicate the attachment of the connector arms to the associated rotor star which should not weaken the overall strength of the connector arms, i.e. the attachment, but still allow for the predetermined weakness in torsion. Therefore, multi-blade rotors having flexbeam units comprising such connector arms are not suitable for comparatively big rotary wing aircrafts where the loads that need to be lifted by the multi-blade rotors trespass a given threshold.

It is, therefore, an object of the present invention to provide a flexbeam unit for a multi-blade rotor of a rotary wing aircraft, said flexbeam unit comprising a plurality of flexbeam elements that are comparatively easy to manufacture, provide for an increased fatigue lifetime of the flexbeam unit and are suitable for use with comparatively big rotary wing aircrafts.

This object is solved by a flexbeam unit for a multi-blade rotor of a rotary wing aircraft, said flexbeam unit comprising a plurality of flexbeam elements with the features of claim 1.

BRIEF SUMMARY OF THE INVENTION

More specifically, according to the invention a flexbeam unit for a multi-blade rotor of a rotary wing aircraft comprises a plurality of flexbeam elements, each defining a load passing member that is attachable to a rotor hub associated with a rotor shaft of said multi-blade rotor. Said plurality of flexbeam elements defines a predetermined number of torsion elements that are connectable with associated rotor blades of said multi-blade rotor, wherein at least one of the predetermined number of torsion elements comprises at least one first flexbeam element defining a first longitudinal direction and at least one second flexbeam element defining a second longitudinal direction, said first and second longitudinal directions being inclined to each other with a predetermined inclination angle. Said at least one first and second flexbeam elements are interconnected by a beam connector in a direction transverse to said first longitudinal direction and/or said second longitudinal direction.

It should be noted that in the context of the present invention the term "torsion element" refers to an element which is torsion elastic and flexible in order to allow for backward and forward lead-lag motions, flapping movements and pitch angle control movements of an associated rotor blade of the multi-blade rotor. Furthermore, these torsion elements are preferably comparatively short, thereby allowing for a rotor blade transition that is comparatively close to the rotor shaft for aerodynamic reasons.

The inventive flexbeam unit is particularly suitable for use with comparatively big rotary wing aircrafts. Furthermore, the flexbeam unit has a comparatively small weight and allows for application of an easy and light main rotor shaft design. In this flexbeam unit, the flexbeam elements can be realized as exchangeable components arranged in a star-shaped configuration that preferably defines an interlaced structure in web-like form with a ring-shaped connection zone having increased connection zone strength providing for an increased fatigue lifetime and allowing for connection in close proximity to the circumference of, and preferably immediately to the rotor shaft.

The ring-shaped connection zone is preferably formed by the load passing members that are defined by the flexbeam elements. Thereby, each load passing member and, thus, each flexbeam element preferably uninterruptedly bypasses the rotor shaft of the multi-blade rotor, so that centrifugal and collective bending loads are not transferred from the rotor blades to the rotor shaft, but via the load passing members of the flexbeam elements to associated rotor blades.

Preferably, each rotor blade of the multi-blade rotor is associated with two load passing members that are connected with, i.e. fixed at an inner fixation point to the rotor hub of the rotor shaft, thereby defining two load passes. In an area enclosed by these two load passes, an associated bearing of a cuff of the multi-blade rotor is arranged. Preferably, one of the two load passing members is inclined in a given sense departing from its inner fixation point at the rotor hub, e.g. going up, and the other one of the two load passing members is preferably inclined in an opposed sense departing from its inner fixation point at the rotor hub, e.g. going down, both load passing members passing beside the area of the associated bearing of the cuff and being connected to each other by an associated beam connector, which thereby preferably rigidly attaches the corresponding flexbeam elements to each other.

Advantageously, the flexbeam elements of the flexbeam unit have a comparatively easy design so that they are easy to manufacture. More specifically, they can preferably be embodied by simple components without complex cross sections and without having transition areas to their cross sections, e.g. with strip-, bar- and/or lath-like beam members with simple rectangular or trapezoidal cross sections that allow for connection to associated rotor blades with no need for a cross section change. Such strip-, bar- and/or lath-like beam members may have a comparatively short length as the afore-mentioned transition areas can be avoided, especially with respect to a flapping weak section constituted thereby. Substantially immediately following such a flapping weak section, flapping stiffness of these strip-, bar- and/or lath-like beam members can be increased rapidly so that no flap stop is required.

Preferably, the strip-, bar- and/or lath-like beam members are manufactured using fiber composite materials. This can be done in a resin transfer molding (RTM) process, as they are merely two-dimensional with a single small bended area having a thickness where the exothermic reaction is reduced.

According to a preferred embodiment, the beam connector comprises at least one first beam connector unit and at least one second beam connector unit, said at least one first beam connector unit being integral with said at least one first flexbeam element and said at least one second beam connector unit being integral with said at least one second flexbeam element.

According to a further preferred embodiment, said at least one first beam connector unit is rigidly attached to said at least one second beam connector unit.

According to a further preferred embodiment, said at least one first beam connector unit is attached to said at least one second beam connector unit by at least one of screwing, riveting and bonding.

Such a configuration using separate beam connector units is advantageous for manufacturing and reparability of the inventive flexbeam unit. Furthermore, using the above described attachment techniques is advantageous in order to allow for exchange of damaged or broken flexbeam elements.

According to a further preferred embodiment, each flexbeam element comprises at least one lath-shaped beam member, said at least one first beam connector unit being integral with a lath-shaped beam member of said at least one first flexbeam element and said at least one second beam connector unit being integral with a lath-shaped beam member of said at least one second flexbeam element.

According to a further preferred embodiment, each flexbeam element comprises at least one upper and one lower lath-shaped beam member, each being integral with an associated beam connector unit.

According to a further preferred embodiment, said at least one first and second flexbeam elements comprise rectangular, or at least trapezoidal, cross sections in said first and second longitudinal directions.

According to a further preferred embodiment, said beam connector defines a beam connector opening angle relative to at least one of said at least one first and second flexbeam elements, said beam connector opening angle being comprised in a range of 5° to 170°. Furthermore, at least one of said at least one first and second flexbeam elements may be inclined by an angle in a range of −45° to +45° relative to a horizontal base line or plane that is defined as a plane that is arranged perpendicular to a longitudinal axis of said rotor shaft of said multi-blade rotor.

According to a further preferred embodiment, said load passing members define a ring-shaped connection zone for attachment to said rotor hub, and said at least one first and second flexbeam elements diverge from said ring-shaped connection zone in direction of the beam connector with said predetermined inclination angle, wherein at least one of said at least one first and second flexbeam elements comprises a kink or curvature in the region of the beam connector that is adapted to redirect said at least one of said at least one first and second flexbeam elements towards said other one of said at least one first and second flexbeam elements.

According to a further preferred embodiment, said at least one of the predetermined number of torsion elements comprises at least one blade connector provided with one or more connecting elements for connection to one of said associated rotor blades, wherein said at least one first and second flexbeam elements cross each other in said first and second longitudinal directions in a region between said beam connector and said at least one blade connector to define a lead-lag hinge.

According to a further preferred embodiment, at least one of said at least one first and second flexbeam elements comprises a lateral kink in the region of the beam connector that is adapted to redirect said at least one of said at least one first and second flexbeam elements towards said at least one blade connector.

According to a further preferred embodiment, said at least one of said at least one first and second flexbeam elements comprises fiber composite material with a plurality of constituting flexbeam element fibers.

According to a further preferred embodiment, each one of said plurality of constituting flexbeam element fibers has a straight and curvature-free shape in the region of said lateral kink or curvature.

According to a further preferred embodiment, said at least one of said at least one first and second flexbeam elements comprises at least two crossing flexbeam element fibers.

According to a further preferred embodiment, said at least one first and second flexbeam elements comprise a reduced stiffness in the region of said lead-lag hinge compared to their stiffness in a region that is adapted to be arranged closer to said rotor hub.

With the above described configuration, the flexbeam elements and, thus, the torsion elements of the inventive flexbeam unit can be embodied with a limited, i.e. comparatively short length and are, in particular, weak in torsion to allow an adjustment of a given pitch angle of the rotor blades of the multi-blade rotor with low forces. Therein, a reasonable, i.e. only comparatively low load is required to apply a given torsion angle.

Furthermore, the flexbeam elements and, in particular, the load passing members defined by them are adapted for transfer of centrifugal force, lead lag and flapping moments of the rotor blades with an enhanced resistance against lead lag and flap shear forces. Moreover, they have an increased stiffness in the lead lag and flapping directions for dynamic reasons, with a comparatively small, but not too small cross section in order to reduce the drag of this area. Also, minimization of the so-called "Wölbtorsion" effect can be obtained due to higher torsional stiffness and additional longitudinal forces.

In addition, a smooth transition from a low stiffness area at the virtual flapping hinge, which is provided to allow for a low flapping hinge distance, to a high stiffness area short after the virtual flapping hinge in the direction of a tip of an associated rotor blade, which is provided in order to allow for low downward deflection of the associated rotor blade, can be obtained. Thereby, generation of no or only comparatively low peak stresses can be obtained.

Furthermore, the inventive load passing members provide area to connect two or more parts of the rotor hub without influencing the flapping hinge distance. Moreover, a comparatively high moment of inertia in flapping direction is provided outside of the flapping hinge. In lead lag direction, this moment of inertia is comparatively high at an inner area besides the rotor shaft and lower more outside for the kinematic of a corresponding lead lag damper.

DETAILED DESCRIPTION OF THE INVENTION

Preferred embodiments of the invention are outlined by way of example in the following description with reference to the attached drawings. In these attached drawings, identical or identically functioning components and elements are labeled with identical reference numbers and characters and are, consequently, only described once in the following description.

Figure 10:
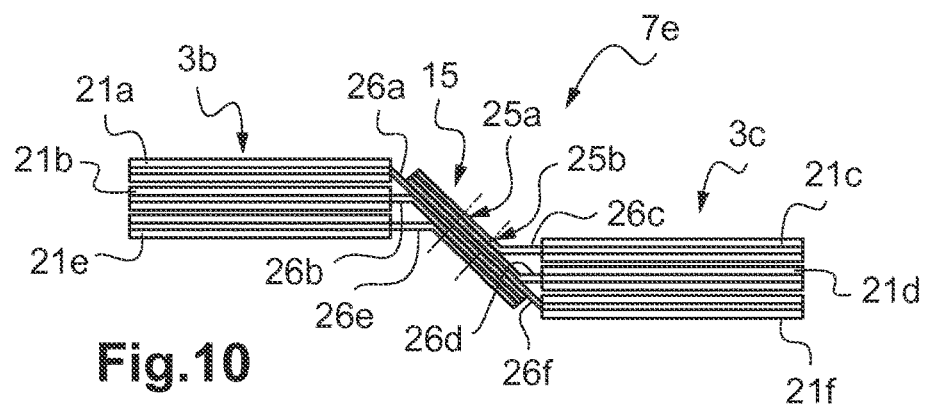
Figure 11:
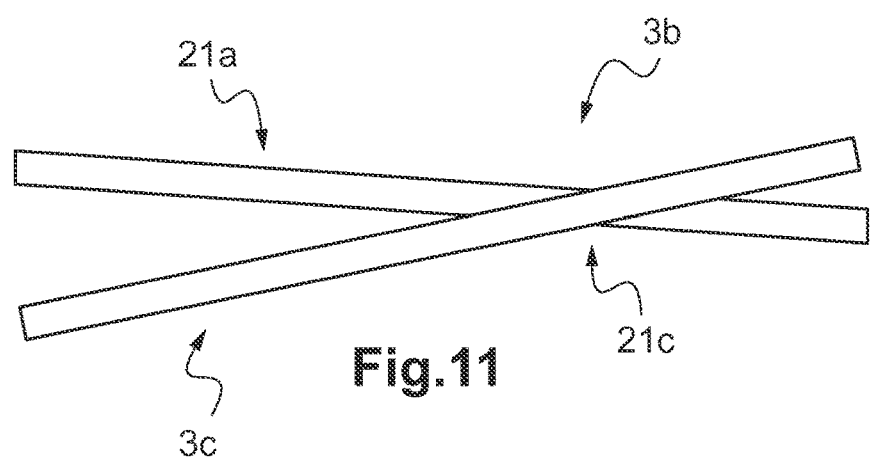
Figure 12:
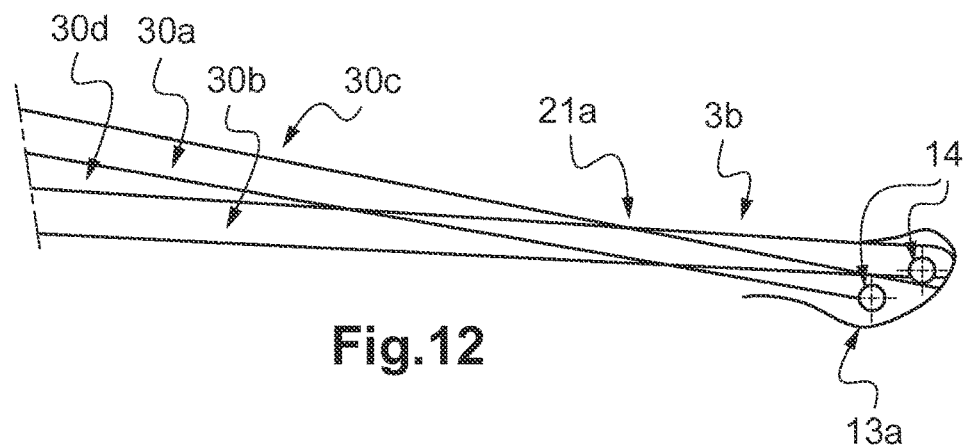

FIG. 1 shows a partially perspective top view of a multi-blade rotor having a flexbeam unit with a multiplicity of torsion elements, a clamping element and a blade connector according to the invention, FIG. 2 shows a top view of an alternative clamping element for use with the multi-blade rotor of FIG. 1, FIG. 3 shows a perspective view of the multi-blade rotor of FIG. 1, without the clamping element and the blade connector of FIG. 1, FIG. 4 shows a top view of a single torsion element of the multi-blade rotor of FIG. 1, FIG. 5 shows a schematic cross section of the torsion element of FIG. 4 according to a first embodiment, FIG. 6 shows the cross section of the torsion element of FIG. 5 in a more detailed view, FIG. 7 shows a schematic cross section of the torsion element of FIG. 4 according to a second embodiment, FIG. 8 shows the cross section of the torsion element of FIG. 7 in a more detailed view, FIG. 9 shows a schematic cross section of the torsion element of FIG. 4 according to a third embodiment, FIG. 10 shows the cross section of the torsion element of FIG. 9 in a more detailed view, FIG. 11 shows a top view of two exemplarily crossing flexbeam elements of the multi-blade rotor of FIG. 1, and FIG. 12 shows a schematic view of one of the flexbeam elements of FIG. 11.

DETAILED DESCRIPTION OF THE INVENTION

FIG. 1 shows a multi-blade rotor 1 of a rotary wing aircraft, in particular a multi-blade rotor for a main rotor of a helicopter. The multi-blade rotor 1 comprises a rotor shaft 5 having a rotor shaft axis 5a that defines a rotation axis of the multi-blade rotor 1. The rotor shaft 5 is embodied with a rotor hub 4 provided with a connection arrangement that comprises a plurality of attachment bolts 4a, 4b, 4c, 4d, 4e.

The multi-blade rotor 1 is preferably embodied as a bearingless or a hinge- and bearingless rotor having a flexbeam unit 3 as interface between the rotor shaft 5 and a plurality of rotor blades 2a, 2b, 2c, 2d, 2e. It should, however, be noted that these rotor blades 2a, 2b, 2c, 2d, 2e are not shown in greater detail, neither in FIG. 1 nor in the remaining figures, for simplicity and clarity of the drawings.

The flexbeam unit 3 preferably comprises a plurality of flexbeam elements 3a, 3b, 3c, 3d, 3e defining a plurality 7 of torsion elements. More specifically, the plurality of flexbeam elements 3a, 3b, 3c, 3d, 3e defines a predetermined number of torsion elements 7a, 7b, 7c, 7d, 7e of the multi-blade rotor 1, such that each one of the torsion elements 7a, 7b, 7c, 7d, 7e is associated with a given rotor blade of the plurality of rotor blades 2a, 2b, 2c, 2d, 2e. Furthermore, each one of the torsion elements 7a, 7b, 7c, 7d, 7e preferably comprises at least one blade connector 13 provided with one or more connecting elements 14 for connection to an associated one of the rotor blades 2a, 2b, 2c, 2d, 2e. However, for simplicity and clarity of the drawings only the torsion element 7e is shown with such a blade connector 13 that comprises two connecting elements 14.

The plurality of flexbeam elements 3a, 3b, 3c, 3d, 3e further defines a ring-shaped connection zone 6 for attachment of the flexbeam unit 3 to the rotor hub 4, wherein each one of the plurality of flexbeam elements 3a, 3b, 3c, 3d, 3e can be attached to one or more of the attachment bolts 4a, 4b, 4c, 4d, 4e of the rotor hub 4. The ring-shaped connection zone 6 preferably has a radius that is as small as possible so that the attachment of the plurality of flexbeam elements 3a, 3b, 3c, 3d, 3e to the rotor hub 4 takes place as close as possible to the rotor shaft axis 5a. Therefore, each flexbeam element 3a, 3b, 3c, 3d, 3e comprises at least one attachment point 10a, 10b, 10c, 10d, 10e for attachment of the flexbeam element 3a, 3b, 3c, 3d, 3e to the rotor hub 4, which is illustratively embodied in the form of a lateral projection projecting into the ring-shaped connection zone 6.

Each flexbeam element 3a, 3b, 3c, 3d, 3e preferably passes the ring-shaped connection zone 6 in a tangential manner and uninterruptedly. It should be noted that in the context of the present invention, the term "tangential manner" means that each flexbeam element 3a, 3b, 3c, 3d, 3e bypasses the rotor shaft 5 in a transverse direction with respect to the rotor shaft axis 5a, preferably, but not necessarily, in close proximity to the circumference of the rotor shaft 5 and/or the rotor hub 4. Furthermore, the term "uninterruptedly" means that the flexbeam elements 3a, 3b, 3c, 3d, 3e have a continuous form in their axial, i.e. longitudinal direction and, thereby, define at least in the proximity of the rotor shaft 5 load passing members 9a, 9b, 9c, 9d, 9e for rotor blades of the plurality of rotor blades 2a, 2b, 2c, 2d, 2e that are interconnected via these load passing members 9a, 9b, 9c, 9d, 9e. The load passing members 9a, 9b, 9c, 9d, 9e embody at least continuous centrifugal-force segments with respect to their associated rotor blades 2a, 2b, 2c, 2d, 2e, i.e. load passes for centrifugal forces that are generated in operation of the rotor blades 2a, 2b, 2c, 2d, 2e.

It should be noted that the attachment points 10a, 10b, 10c, 10d, 10e of the flexbeam elements 3a, 3b, 3c, 3d, 3e are illustratively arranged in the area of the load passing members 9a, 9b, 9c, 9d, 9e. Accordingly, the load passing members 9a, 9b, 9c, 9d, 9e are attachable to the rotor hub 4 of the rotor shaft 5.

Each flexbeam element 3a, 3b, 3c, 3d, 3e preferably overlaps at least one in the circumferential direction of the ring-shaped connection zone 6 immediately following flexbeam element 3a, 3b, 3c, 3d, 3e and is preferably overlapped by at least one in the circumferential direction of said ring-shaped connection zone 6 immediately preceding flexbeam element 3a, 3b, 3c, 3d, 3e. Thus, the flexbeam elements 3a, 3b, 3c, 3d, 3e define a star-shaped configuration and, more particularly, an interlaced structure in web-like form. In this interlaced structure, the flexbeam element 3a illustratively overlaps the flexbeam element 3b and is overlapped by the flexbeam element 3d, which in turn is overlapped by the flexbeam element 3c, which in turn is overlapped by the flexbeam element 3e, which in turn is overlapped by the flexbeam element 3b, which in turn is overlapped by the flexbeam element 3a, as mentioned above.

Preferably, at least one substantially rigid clamping element 11 is arranged in the area of the ring-shaped connection zone 6 to stick the plurality of flexbeam elements 3a, 3b, 3c, 3d, 3e in the star-shaped configuration together. The at least one clamping element 11 illustratively resembles to a sea star and comprises a central part 11f that substantially covers the ring-shaped connection zone 6, and a plurality of clamping arms 11a, 11b, 11c, 11d, 11e emanating from the central part 11f in radial direction thereof.

It should be noted that the clamping element 11 is shown as a transparent component for purposes of illustration, such that it does not hide other components that are arranged below. However, it should be clear that the clamping element 11 is not necessarily transparent.

Each one of the plurality of clamping arms 11a, 11b, 11c, 11d, 11e preferably comprises associated fixation means of a plurality of fixation means 31 for attaching each one of the plurality of clamping arms 11a, 11b, 11c, 11d, 11e to an associated flexbeam element 3a, 3b, 3c, 3d, 3e. Furthermore, each one of the plurality of clamping arms 11a, 11b, 11c, 11d, 11e comprises an associated control cuff bearing. However, for simplicity and clarity of the drawings only the control cuff bearing provided on the clamping arm 11a is designated with the reference number 12. These control cuff bearings are embodied for bearing a control cuff associated with the multi-blade rotor 1, the control cuff being adapted for setting a current pitch or blade angle of the rotor blades 2a, 2b, 2c, 2d, 2e by controlling an associated torsion of the torsion elements 7a, 7b, 7c, 7d, 7e, i.e. of the flexbeam elements 3a, 3b, 3c, 3d, 3e.

Preferably, an additional clamping element is provided such that the clamping element 11 defines e.g. an upper clamping element and that the additional clamping element defines an associated lower clamping element, which can be embodied substantially similar to the upper clamping element 11 and which is e.g. arranged opposed thereto in the axial direction of the rotor shaft 5. In this configuration, the fixation means 31 can be adapted to allow for fixing axially opposed clamping arms of the upper clamping element 11 and the associated lower clamping element together, so that the flexbeam elements 3a, 3b, 3c, 3d, 3e are clamped between these axially opposed clamping arms.

Each one of the flexbeam elements 3a, 3b, 3c, 3d, 3e preferably connects at least one first torsion element 7a, 7b, 7c, 7d, 7e to at least one second torsion element 7a, 7b, 7c, 7d, 7e of the predetermined number of torsion elements 7a, 7b, 7c, 7d, 7e. The at least one first torsion element 7a, 7b, 7c, 7d, 7e is preferably associated with a n-th rotor blade of the plurality of rotor blades 2a, 2b, 2c, 2d, 2e and the at least one second torsion element 7a, 7b, 7c, 7d, 7e is preferably associated with a (n+2)-th rotor blade 2a, 2b, 2c, 2d, 2e in the circumferential direction of the ring-shaped connection zone 6. In other words, the at least one first torsion element 7a, 7b, 7c, 7d, 7e is associated with a given rotor blade of the plurality of rotor blades 2a, 2b, 2c, 2d, 2e and the at least one second torsion element 7a, 7b, 7c, 7d, 7e is associated with a second following or after-next rotor blade 2a, 2b, 2c, 2d, 2e in either of the rotation directions of the multi-blade rotor 1.

Illustratively, the flexbeam element 3a connects the torsion element 7a to the torsion element 7c, which is the after-next torsion element with respect to the torsion element 7a in the counter-clockwise direction of the multi-blade rotor 1. The flexbeam element 3b connects the torsion element 7b to the torsion element 7e, which is the after-next torsion element with respect to the torsion element 7b in the clockwise direction of the multi-blade rotor 1. The flexbeam element 3c connects the torsion element 7c to the torsion element 7e, which is the after-next torsion element with respect to the torsion element 7c in the counter-clockwise direction of the multi-blade rotor 1. The flexbeam element 3d connects the torsion element 7d to the torsion element 7b, which is the after-next torsion element with respect to the torsion element 7d in the clockwise direction of the multi-blade rotor 1. The flexbeam element 3e connects the torsion element 7d to the torsion element 7a, which is the after-next torsion element with respect to the torsion element 7d in the counter-clockwise direction of the multi-blade rotor 1.

In this manner, preferably a total number N of torsion elements 7a, 7b, 7c, 7d, 7e is embodied using a total number N of flexbeam elements 3a, 3b, 3c, 3d, 3e, wherein the first torsion element 7a, 7b, 7c, 7d, 7e is a n-th torsion element and the second torsion element 7a, 7b, 7c, 7d, 7e is a (n+2)-th torsion element in the circumferential direction of the ring-shaped connection zone 6, with $1 \leq n \leq N$. In other words, each one of the torsion elements 7a, 7b, 7c, 7d, 7e is connected via at least one of the flexbeam elements 3a, 3b, 3c, 3d, 3e with a second following or after-next torsion element 7a, 7b, 7c, 7d, 7e in either of the rotation directions of the multi-blade rotor 1.

Illustratively, the torsion element 7a is connected via the flexbeam element 3a to the torsion element 7c, which is the after-next torsion element with respect to the torsion element 7a in the counter-clockwise direction of the multi-blade rotor 1, and via the flexbeam element 3e to the torsion element 7d, which is the after-next torsion element with respect to the torsion element 7a in the clockwise direction of the multi-blade rotor 1. The torsion element 7b is connected via the flexbeam element 3b to the torsion element 7e, which is the after-next torsion element with respect to the torsion element 7b in the clockwise direction of the multi-blade rotor 1, and via the flexbeam element 3d to the torsion element 7d, which is the after-next torsion element with respect to the torsion element 7b in the counter-clockwise direction of the multi-blade rotor 1. The torsion element 7c is connected via the flexbeam element 3c to the torsion element 7e, which is the after-next torsion element with respect to the torsion element 7c in the counter-clockwise direction of the multi-blade rotor 1, and via the flexbeam element 3a to the torsion element 7a, which is the after-next torsion element with respect to the torsion element 7c in the clockwise direction of the multi-blade rotor 1. The torsion element 7d is connected via the flexbeam element 3d to the torsion element 7b, which is the after-next torsion element with respect to the torsion element 7d in the clockwise direction of the multi-blade rotor 1, and via the flexbeam element 3e to the torsion element 7a, which is the after-next torsion element with respect to the torsion element 7d in the counter-clockwise direction of the multi-blade rotor 1. The torsion element 7e is connected via the flexbeam element 3b to the torsion element 7b, which is the after-next torsion element with respect to the torsion element 7e in the counter-clockwise direction of the multi-blade rotor 1, and via the flexbeam element 3c to the torsion element 7c, which is the after-next torsion element with respect to the torsion element 7e in the clockwise direction of the multi-blade rotor 1.

It should be noted that each one of the torsion elements 7a, 7b, 7c, 7d, 7e comprises by way of example two separate flexbeam elements 3a, 3d, 3c, 3d, 3e, but may alternatively also comprise more than two separate flexbeam elements as well as other components, which are not illustrated for simplicity and clarity of the drawings, but which are well-known by the person skilled in the art. Illustratively, the torsion element 7a comprises the two flexbeam elements 3a and 3e, the torsion element 7b comprises the two flexbeam elements 3b and 3d, the torsion element 7c comprises the two flexbeam elements 3a and 3c etc. Each such two flexbeam elements 3a, 3e; 3b, 3d; 3a, 3c etc. are preferably rigidly attached to each other via an associated beam connector of a plurality of beam connectors 8, as explained in more detail in the following with reference to the flexbeam elements 3b, 3c. For simplicity and clarity of the drawings and the further description, only the beam connector of the torsion element 7e is designated by an individual reference number, i.e. the number 15.

It should further be noted that, in the multi-blade rotor 1, the number N of the torsion elements 7a, 7b, 7c, 7d, 7e equals the number of the rotor blades 2a, 2b, 2c, 2d, 2e and also the number of the flexbeam elements 3a, 3d, 3c, 3d, 3e. More specifically, the multi-blade rotor 1 comprises illustratively a number of N=5 torsion elements 7a, 7b, 7c, 7d, 7e that are defined using a number of five flexbeam elements 3a, 3d, 3c, 3d, 3e and that are connected with a number of five rotor blades 2a, 2b, 2c, 2d, 2e. However, in the multi-blade rotor 1 the number N is set to N=5 only by way of example and not for restricting the invention thereto, as the invention can be applied to all multi-blade rotors having three or more rotor blades and torsion elements, i.e. for all multi-blade rotors where $N \geq 3$.

FIG. 2 shows an alternative clamping element 16 that can be used to embody the clamping element 11 of FIG. 1 and/or the lower clamping element described above. Instead of having a sea star form with a central part having a plurality of clamping arms emanating from the central part in radial direction thereof, the clamping element 16 is embodied as a pentagon-shaped and at least partially rigid clamping member preferably having a central clamping element axis 18, around which a central hole could be embodied, and five clamping corners 17a, 17b, 17c, 17d, 17e, each one comprising an associated control cuff bearing 12. These clamping corners 17a, 17b, 17c, 17d, 17e are connected with adjacent clamping corners by clamping element edges 19a, 19b, 19c, 19d, 19e that define with corresponding adjacent ones of the clamping corners 17a, 17b, 17c, 17d, 17e clamping element sections 16a, 16b, 16c, 16d, 16e. In these clamping element sections 16a, 16b, 16c, 16d, 16e, the clamping element edges 19a, 19b, 19c, 19d, 19e are preferably straight, as illustrated.

It should, however, be noted that the clamping element edges 19a, 19b, 19c, 19d, 19e can be implemented using other edge forms, as illustrated by way of example with alternative edge forms 20a, 20b, 20c, which are only shown with respect to the clamping element edge 19b for simplicity and clarity of the drawings, but which can likewise be applied to one or more of the other clamping element edges 19a, 19c, 19d, 19e. Thereby, the alternative edge form 20a illustrates a convex shaping of the clamping element edge 19b. The alternative edge form 20b illustrates a concave shaping of the clamping element edge 19b. The alternative edge form 20c shows another concave shaping of the clamping element 19b with a higher degree of concavity which leads to the shaping shown e.g. in FIG. 1 with respect to the clamping element 11, when being applied to all clamping element edges 19a, 19b, 19c, 19d, 19e.

FIG. 3 shows the multi-blade rotor 1 of FIG. 1 with the flexbeam unit 3 that is attached to the rotor hub 4 of the rotor shaft 5. The multi-blade rotor 1 is shown without the clamping element 11 of FIG. 1 to highlight the interlaced structure in web-like form defining the star-shaped configuration of the flexbeam elements 3a, 3b, 3c, 3d, 3e, wherein each flexbeam element 3a, 3b, 3c, 3d, 3e overlaps at least one other and is overlapped by at least one other flexbeam element 3a, 3b, 3c, 3d, 3e.

Each flexbeam element 3a, 3b, 3c, 3d, 3e comprises one or more strip-, bar- and/or lath-shaped beam members, which are hereinafter simply referred to as the "lath-shaped beam members" and which can be connected to each other, at least partially, or not. Preferably, each flexbeam element 3a, 3b, 3c, 3d, 3e comprises at least one upper and one lower lath-shaped beam member. Illustratively, the flexbeam element 3b comprises an upper lath-shaped beam member 21a and a lower lath-shaped beam member 21b and the flexbeam element 3c comprises an upper lath-shaped beam member 21c and a lower lath-shaped beam member 21d. It should, however, be noted that the lath-shaped members of the remaining flexbeam elements 3a, 3d, 3e are not referenced individually for simplicity and clarity of the drawings.

The lath-shaped beam members 21a, 21b, 21c, 21d are preferably embodied in fiber composite material. In particular, the lath-shaped beam members 21a, 21b, 21c, 21d can be manufactured using a RTM process. Possible gaps between the lath-shaped beam members 21a, 21b, 21c, 21d of a given flexbeam element 3b, 3c can be filled e.g. with TEFLON® woven fabric bonded to one or more associated contact surfaces which do not necessarily be in contact with each other. Alternatively, small air filled gaps are possible.

As can be seen from FIG. 3, the flexbeam elements 3a, 3b, 3c, 3d, 3e of each torsion element 7a, 7b, 7c, 7d, 7e of the multi-blade rotor 1 preferably enclose an associated opening or inclination angle α, which is referred to by the reference number 22 and best illustrated and described in the following by way of example with respect to the flexbeam elements 3b, 3c. These flexbeam elements 3b, 3c are preferably substantially arranged in parallel at the rotor hub 4 or at least only with a comparatively small changing distance in height.

The flexbeam element 3b defines a first longitudinal direction and the flexbeam element 3c defines a second longitudinal direction. In said first and second longitudinal directions, the flexbeam elements 3b, 3c preferably comprise rectangular, or at least trapezoidal, cross sections. Furthermore, the flexbeam element 3b overlaps the flexbeam element 3e and the flexbeam element 3c is overlapped by the flexbeam element 3e, such that the flexbeam elements 3b, 3c and, thus, the first and second longitudinal directions diverge from the ring-shaped connection zone 6 in direction of the beam connector 15 with the inclination angle 22, which may be in the range from 0° to about 20°.

Preferably, the inclination angle 22 is corrected by the beam connector 15 that is used to attach both flexbeam elements 3b, 3c together. To this end, the beam connector 15 is arranged in a direction transverse to said first longitudinal direction and/or said second longitudinal direction, and is adapted to allow for a change of inclination of the flexbeam elements 3b, 3c. More specifically, the inclination of the flexbeam elements 3b, 3c can change in the area of the beam connector 15 to an at least substantially parallel alignment of the flexbeam elements 3b, 3c, as the beam connector 15 would compensate all loads that apply perpendicularly to the flexbeam elements 3b, 3c in the area of the beam connector 15, in particular centrifugal and bending loads.

In the region of the beam connector 15, preferably at least one of the flexbeam elements 3b, 3c comprises a curvature or a kink that is adapted to redirect said at least one of the flexbeam elements 3b, 3c towards said other one of the flexbeam elements 3b, 3c. For brevity, in the following only the term "kink" will be used. Illustratively, each one of the flexbeam elements 3b, 3c comprises such a kink, wherein the flexbeam element 3b comprises a kink 23b and the flexbeam element 3c comprises a kink 23c, which are by way of example oriented in a vertical direction and, therefore, hereinafter referred to as the "vertical kinks".

Preferably, the beam connector 15 comprises two separate beam connector components 15a, 15b that are embodied in the form of shear webs. These beam connector components 15a, 15b are connected together, and in particular rigidly attached to each other, by means of screws, rivets and/or a bonding process, as described in more detail with reference to FIGS. 5 to 10 below. The attachment of the beam connector components 15a, 15b can be releasable in order to allow for an exchange of damaged or broken components.

The beam connector component 15a is preferably integral with the flexbeam element 3c and, more specifically, with the upper lath-shaped beam member 21c thereof. The beam connector component 15b is preferably integral with the flexbeam element 3b and, more specifically, with the lower lath-shaped beam member 21b thereof.

The beam connector components 15a, 15b define connection units that are adapted to allow for an interconnection of the flexbeam elements 3b, 3c. Therefore, the beam connector components 15a, 15b are likewise referred to as "beam connector units" hereinafter.

FIG. 4 shows the flexbeam elements 3b, 3c of the multi-blade rotor 1 of FIG. 1 and FIG. 3 which define the torsion element 7e of FIG. 1 and FIG. 3 with the beam connector 15. The flexbeam elements 3b, 3c comprise the lath-shaped beam members 21a, 21c having the vertical kinks 23b, 23c in the region of the beam connector 15 according to FIG. 3. Preferably at least one, and illustratively each one, of the flexbeams 3b, 3c further comprises an associated lateral curvature or kink 24b, 24c in the region of the beam connector 15 that is adapted to redirect the corresponding flexbeam element 3b, 3c towards the blade connector 13 of FIG. 1. Analogously to the vertical kinks 23b, 23c, these lateral curvatures 24b, 24c will only be referred to as "lateral kinks" hereinafter, for brevity.

Furthermore, the flexbeam elements 3b, 3c preferably cross each other in their longitudinal directions in a region between the beam connector 15 and the blade connector 13 of FIG. 1 to define a lead-lag hinge 28. In the region of said lead-lag hinge 28, the flexbeam elements 3b, 3c preferably have a reduced stiffness compared to their stiffness in a region that is adapted to be arranged closer to the rotor hub 4 of the rotor shaft 5 of the multi-blade rotor 1 of FIG. 1 and FIG. 3.

FIG. 5 shows the torsion element 7e with the flexbeam elements 3b, 3c of FIG. 1, FIG. 3 and FIG. 4 having the lath-shaped beam members 21a, 21b, 21c, 21d of FIG. 3, in order to illustrate an arrangement of the flexbeam elements 3b, 3c relative to each other and relative to the beam connector 15. The beam connector 15 preferably defines a beam connector opening angle 27 relative to at least one of the flexbeam elements 3b, 3c, which is comprised in a range of 5° to 170°. This allows the flexbeam element 3b to be arranged in a position relative to the flexbeam element 3c which can vary dependent on a selected realization of the torsion element 7e from almost horizontally or laterally side-by-side to almost vertically superimposed.

Illustratively, the flexbeam elements 3b, 3c are shown having transversal axes 32a, 32b that are arranged parallel to each other and parallel to a horizontal base line or plane 29 that is defined e.g. in prolongation to the transversal axis 32b. However, the flexbeam element 3b may either be inclined by a positive angle 33a between 0° and +45° or a negative angle 33b between 0° and −45° relative to the horizontal base line or plane 29. Furthermore, the flexbeam element 3c may either be inclined by a positive angle 33c between 0° and +45° or a negative angle 33d between 0° and −45° relative to the horizontal base line or plane 29. Thereby, the flexbeam elements 3b, 3c may be inclined such that their transversal axes 32a, 32b remain parallel. It should be noted that this also applies to the embodiments described below with reference to FIG. 6 to FIG. 10.

FIG. 6 shows the torsion element 7e with the flexbeam elements 3b, 3c having the lath-shaped beam members 21a, 21b, 21c, 21d according to FIG. 5. Preferably, each lath-shaped beam member 21a, 21b, 21c, 21d is connected with an associated beam connector unit 26a, 26b, 26c, 26d. These beam connector units 26a, 26b, 26c, 26d illustratively define the beam connector 15.

By way of example, the beam connector units 26a, 26b, 26c, 26d are interconnected at associated fixation points 25a, 25b by at least one of screwing, riveting and bonding. Thus, the beam connector units 26a, 26b, 26c, 26d and, accordingly, the flexbeam elements 3b, 3c are rigidly attached to each other.

FIG. 7 shows the torsion element 7e with the flexbeam elements 3b, 3c of FIG. 1, FIG. 3 and FIG. 4, each of which is according to a first alternative embodiment only equipped with a single lath-shaped beam member. Illustratively, the flexbeam element 3b only comprises the lath-shaped beam member 21a of FIG. 3 and the flexbeam element 3c only comprises the lath-shaped beam member 21c of FIG. 3.

FIG. 8 shows the torsion element 7e with the flexbeam elements 3b, 3c having the lath-shaped beam members 21a, 21c according to FIG. 7. Preferably, each lath-shaped beam member 21a, 21c is connected with an associated beam connector unit. By way of example, the lath-shaped beam member 21a is connected with the beam connector unit 26a of FIG. 6 and the lath-shaped beam member 21c is connected with the beam connector unit 26c of FIG. 6. These beam connector units 26a, 26c illustratively define the beam connector 15.

By way of example, the beam connector units 26a, 26c are interconnected at the associated fixation points 25a, 25b of FIG. 6 by at least one of screwing, riveting and bonding. Thus, the beam connector units 26a, 26c and, accordingly, the flexbeam elements 3b, 3c are rigidly attached to each other.

FIG. 9 shows the torsion element 7e with the flexbeam elements 3b, 3c of FIG. 1, FIG. 3 and FIG. 4, each of which is according to a second alternative embodiment equipped with three lath-shaped beam members. Illustratively, the flexbeam element 3b comprises the lath-shaped beam members 21a, 21b, of FIG. 3 and an additional lath-shaped beam member 21e, and the flexbeam element 3c comprises the lath-shaped beam members 21c, 21d of FIG. 3 and an additional lath-shaped beam member 21f.

FIG. 10 shows the torsion element 7e with the flexbeam elements 3b, 3c having the lath-shaped beam members 21a, 21b, 21e, 21c, 21d, 21f according to FIG. 9. Preferably, each lath-shaped beam member 21a, 21b, 21c, 21d, 21e, 21f is connected with an associated beam connector unit. By way of example, the lath-shaped beam members 21a, 21b, 21c, 21d are connected with the beam connector units 26a, 26b, 26c, 26d of FIG. 6 and the lath-shaped beam members 21e, 21f are connected with beam connector units 26e, 26f. These beam connector units 26a, 26b, 26c, 26d, 26e, 26f illustratively define the beam connector 15.

By way of example, the beam connector units 26a, 26b, 26c, 26d, 26e, 26f are interconnected at the associated fixation points 25a, 25b of FIG. 6 by at least one of screwing, riveting and bonding. Thus, the beam connector units 26a, 26b, 26c, 26d and, accordingly, the flexbeam elements 3b, 3c are rigidly attached to each other.

FIG. 11 shows the flexbeam elements 3b, 3c having the lath-shaped beam members 21a, 21c according to FIG. 3 with an at least substantially straight form. In other words, according to FIG. 9 a realization of the flexbeam elements 3b, 3c without the lateral kinks 24b, 24c and/or vertical kinks 23b, 23c of FIG. 4 can be envisaged.

FIG. 12 shows a preferred embodiment of the flexbeam element 3b or 3c of FIG. 3 and FIG. 4. Preferably, the flexbeam element 3b comprises fiber composite material with a plurality of constituting flexbeam element fibers 30a, 30b, 30c, 30d, each having a straight and curvature-free shape, in particular in the region of lateral kinks 24b, 24c of FIG. 3. Furthermore, the flexbeam element 3b illustratively comprises at least two crossing flexbeam element fibers 30a, 30b, 30c, 30d.

Furthermore, the flexbeam element 3b illustratively comprises an increased, curved area with a blade connector 13a, which is preferably part of the blade connector 13 of FIG. 1 and which comprises the connecting elements 14 of FIG. 1. Preferably, the flexbeam element 3c of FIG. 3, which forms the torsion element 7e of FIG. 3 together with the flexbeam element 3b, also comprises such an increased, curved area with the blade connector 13a, such that the associated rotor blade 2e of FIG. 1 can be connected between the two blade connectors 13a.

It should be noted that the above described, preferred embodiments are merely described to illustrate possible embodiments of the present invention, but not in order to restrict the present invention thereto. Instead, multiple modifications and variations of the invention are possible and should, therefore, also be considered as being part of the invention. For instance, instead of fixing the flexbeam elements 3a, 3b, 3c, 3d, 3e and the clamping elements 11 to only five attachment bolts 4a, 4b, 4c, 4d, 4e of the rotor hub 4 in FIG. 1, additional attachment bolts can be provided, etc.

It should further be noted that the foregoing description mainly refers to the torsion element 7e and the flexbeam elements 3b, 3c. This should be understood as representative for all torsion elements and flexbeam elements of the multi-blade rotor 1 of FIG. 1.

REFERENCE LIST 1 multi-blade rotor
2a, 2b, 2c, 2d, 2e rotor blades
3 flexbeam unit
3a, 3b, 3c, 3d, 3e flexbeam elements
4 rotor hub
4a, 4b, 4c, 4d, 4e attachment bolts
5 rotor shaft
5a rotor shaft axis
6 connection zone
7 plurality of torsion elements 7a, 7b, 7c, 7d, 7e torsion elements
8 plurality of beam connectors
9a, 9b, 9c, 9d, 9e load passing members
10a, 10b, 10c, 10d, 10e attachment point
11 upper clamping element
11a, 11b, 11c, 11d, 11e upper clamping arms
11f central upper clamping element part
12 control cuff bearing arrangement
13, 13a blade connector
14 connecting elements
15 beam connector
15a, 15b beam connector components
16 alternative clamping element
16a, 16b, 16c, 16d, 16e clamping element sections
17a, 17b, 17c, 17d, 17e clamping corners
18 clamping element axis
19a, 19b, 19c, 19d, 19e clamping element edges
20a, 20b, 20c alternative edge forms
21a, 21b, 21c, 21d, 21e, 21f lath-shaped beam members
22 inclination angle
23b, 23c vertical kinks
24b, 24c horizontal or lateral kinks
25a, 25b fixation points
26a, 26b, 26c, 26d, 26e, 26f beam connector units
27 beam connector opening angle
28 lead-lag hinge
29 horizontal base line
30a, 30b, 30c, 30d principal fiber directions
31 fixation means
32a, 32b transversal axes
33a, 33b, 33c, 33d beam inclination angels

What is claimed is:

1. A flexbeam unit for a multi-blade rotor of a rotary wing aircraft, said flexbeam unit comprising a plurality of flexbeam elements, each defining a load passing member that is attachable to a rotor hub associated with a rotor shaft of said multi-blade rotor, said plurality of flexbeam elements defining a predetermined number of torsion elements that are connectable with associated rotor blades of said multi-blade rotor, wherein at least one of the predetermined number of torsion elements comprises at least one first flexbeam element defining a first longitudinal direction and at least one second flexbeam element defining a second longitudinal direction, said first and second longitudinal directions being inclined to each other with a predetermined inclination angle, and wherein said at least one first and second flexbeam elements are interconnected by a beam connector in a direction transverse to said first longitudinal direction and/or said second longitudinal direction.

2. The flexbeam unit according to claim 1, wherein the beam connector comprises at least one first beam connector unit and at least one second beam connector unit, said at least one first beam connector unit being integral with said at least one first flexbeam element and said at least one second beam connector unit being integral with said at least one second flexbeam element.

3. The flexbeam unit according to claim 2, wherein said at least one first beam connector unit is rigidly attached to said at least one second beam connector unit.

4. The flexbeam unit according to claim 3, wherein said at least one first beam connector unit is attached to said at least one second beam connector unit by at least one of screwing, riveting and bonding.

5. The flexbeam unit according to claim 2, wherein each flexbeam element comprises at least one lath-shaped beam member, said at least one first beam connector unit being integral with a lath-shaped beam member of said at least one first flexbeam element and said at least one second beam connector unit being integral with a lath-shaped beam member of said at least one second flexbeam element.

6. The flexbeam unit according to claim 5, wherein each flexbeam element comprises at least one upper and one lower lath-shaped beam member, each being integral with an associated beam connector unit.

7. The flexbeam unit according to claim 1, wherein at least one first and second flexbeam elements comprise rectangular, or at least trapezoidal, cross sections in said first and second longitudinal directions.

8. The flexbeam unit according to claim 1, wherein said beam connector defines a beam connector opening angle relative to at least one of said at least one first and second flexbeam elements, said beam connector opening angle being comprised in a range of 5° to 170°.

9. The flexbeam unit according to claim 1, wherein said load passing members define a ring-shaped connection zone for attachment to said rotor hub, and that said at least one first and second flexbeam elements diverge from said ring-shaped connection zone in direction of the beam connector with said predetermined inclination angle, wherein at least one of said at least one first and second flexbeam elements comprises a kink in a region of the beam connector that is adapted to redirect said at least one of said at least one first and second flexbeam elements towards said other one of said at least one first and second flexbeam elements.

10. The flexbeam unit according to claim 1, wherein said at least one of the predetermined number of torsion elements comprises at least one blade connector provided with one or more connecting elements for connection to one of said associated rotor blades, wherein said at least one first and second flexbeam elements cross each other in said first and second longitudinal directions in a region between said beam connector and said at least one blade connector to define a lead-lag hinge.

11. The flexbeam unit according to claim 10, wherein at least one of said at least one first and second flexbeam elements comprises a lateral kink in the region of the beam connector that is adapted to redirect said at least one of said at least one first and second flexbeam elements towards said at least one blade connector.

12. The flexbeam unit according to claim 11, wherein said at least one of said at least one first and second flexbeam elements comprises fiber composite material with a plurality of constituting flexbeam element fibers.

13. The flexbeam unit according to claim 12, wherein each one of said plurality of constituting flexbeam element fibers has a straight and curvature-free shape in the region of said lateral kink.

14. The flexbeam unit according to claim 13, wherein said at least one of said at least one first and second flexbeam elements comprises at least two crossing flexbeam element fibers.

15. The flexbeam unit according to claim 10, wherein said at least one first and second flexbeam elements comprise a reduced stiffness in the region of said lead-lag hinge compared to their stiffness in a region that is adapted to be arranged closer to said rotor hub.

\* \* \* \* \*